United States Patent
Hill (10) Patent No.: US 10,174,948 B2
(45) Date of Patent: Jan. 8, 2019

(54) COMBUSTION STAGING SYSTEM

(71) Applicant: ROLLS-ROYCE, PLC, London (GB)

(72) Inventor: Ralph Hill, Derby (GB)

(73) Assignee: ROLLS-ROYCE PLC, London (GB)

( * ) Notice: Subject to any disclaimer, the term of this patent is extended or adjusted under 35 U.S.C. 154(b) by 385 days.

(21) Appl. No.: 14/968,262

(22) Filed: Dec. 14, 2015

(65) Prior Publication Data
US 2016/0245524 A1 Aug. 25, 2016

(30) Foreign Application Priority Data

Feb. 25, 2015 (GB) .................................. 1503162.8

(51) Int. Cl.
*F02C 7/22* (2006.01)
*F23R 3/34* (2006.01)
(Continued)

(52) U.S. Cl.
CPC ............. *F23R 3/346* (2013.01); *F02C 7/222* (2013.01); *F02C 7/228* (2013.01); *F02C 7/232* (2013.01); *F02C 9/263* (2013.01); *F02C 9/34* (2013.01); *F23R 3/283* (2013.01); *F02C 7/14* (2013.01); *F02C 7/22* (2013.01); *F02C 9/26* (2013.01); *F02C 9/46* (2013.01);
(Continued)

(58) Field of Classification Search
CPC F23R 3/283; F23R 3/346; F23R 2900/00004; F02C 7/14; F02C 7/22; F02C 7/222; F02C 7/228; F02C 7/232; F02C 9/26; F02C 9/263; F02C 9/34; F02C 9/36; F02C 9/38; F02C 9/46
See application file for complete search history.

(56) References Cited

U.S. PATENT DOCUMENTS 5,187,936 A * 2/1993 Kast .................... F02C 7/232
417/302
5,448,882 A * 9/1995 Dyer ................... F02C 7/228
60/39.281

(Continued)

FOREIGN PATENT DOCUMENTS

EP 2339147 A2 6/2011
EP 2341231 A2 7/2011
(Continued)

*Primary Examiner* — Gerald L Sung
*Assistant Examiner* — James McGlynn
(74) *Attorney, Agent, or Firm* — Oliff PLC (57) ABSTRACT

A combustion staging system for fuel injectors of a multi-stage combustor of a gas turbine engine has pilot and mains fuel manifolds distributing fuel to the injectors. A splitting unit splits a fuel flow and sends portions of the flow to pilot and mains fuel manifolds to perform staging control of the combustor. The splitting unit can deselect the mains manifold so that there is no flow into the combustor from the mains manifold. A cooling flow recirculation line provides a cooling flow of fuel to the mains manifold when that manifold is deselected so that the mains manifold remains primed with relatively cool fuel. A return section collects the cooling flow from the mains manifold. One or more fuel pressure sensors detect pressure of the cooling flow on the recirculation line. A control arrangement closes off the recirculation line when the pressure sensor(s) indicates failure of the cooling flow.

10 Claims, 6 Drawing Sheets

(51) Int. Cl.
  *F23R 3/28* (2006.01)
  *F02C 7/228* (2006.01)
  *F02C 7/232* (2006.01)
  *F02C 9/34* (2006.01)
  *F02C 9/46* (2006.01)
  *F02C 9/26* (2006.01)
  *F02C 7/14* (2006.01)

(52) U.S. Cl.
  CPC .. *F05D 2260/602* (2013.01); *F05D 2270/301* (2013.01); *F23R 2900/00004* (2013.01)

(56) References Cited

U.S. PATENT DOCUMENTS

| | | | |
|---|---|---|---|
| 5,448,890 | A | 9/1995 | Coughlan, III et al. |
| 5,899,073 | A * | 5/1999 | Akimaru ............ F02C 3/22 60/39.465 |
| 8,549,859 | B2 * | 10/2013 | Fox ............ F23R 3/16 60/733 |
| 8,973,366 | B2 * | 3/2015 | Zhang ............ F23K 5/06 137/897 |
| 2005/0166573 | A1 | 8/2005 | Hommema |
| 2008/0271456 | A1 | 11/2008 | Scully et al. |
| 2012/0159953 | A1 * | 6/2012 | Griffiths ............ F02C 7/228 60/734 |
| 2013/0042920 | A1 | 2/2013 | Snodgrass et al. |

FOREIGN PATENT DOCUMENTS

| | | | |
|---|---|---|---|
| EP | 2469057 | A1 | 6/2012 |
| EP | 2837799 | A1 | 2/2015 |

* cited by examiner

COMBUSTION STAGING SYSTEM

FIELD OF THE INVENTION

The present invention relates to a combustion staging system for fuel injectors of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a fuel flow scheduling valve (FFSV), is typically associated with each feed in order to prevent combustion chamber gases entering the fuel system. The FFSVs also prevent fuel flow into the injector nozzle when the supply pressure is less than the cracking pressure.

Multi-stage combustors may have further stages and/or manifolds. For example, the pilot manifold may be split into two manifolds for lean blow-out prevention.

During pilot-only operation, the splitter valve directs fuel for burning flows only through the pilot fuel circuit (i.e. pilot manifold and feeds). It is therefore conventional to control temperatures in the stagnant (i.e. mains) fuel circuit to prevent coking due to heat pick up from the hot engine casing. One known approach, for example, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

A problem associated with this approach is that blockage may occur in the recirculation line. The consequence of such a failure is dependent on the location of the blockage. For example, if the blockage occurs on the recirculation downstream of the injectors, the result can be an increased pressure in the recirculation line which opens the mains FFSVs, potentially causing hot streaks and, as a consequence, turbine damage. If the blockage occurs on the recirculation line upstream of the injectors, the result can be a loss of cooling flow and/or pressure in the recirculation line at the injectors, potentially resulting in combustion gases leaking past the mains FFSVs and thence to the low pressure side fuel system of the system via the exit from recirculation line. This can lead to damage and/or failure within the fuel system.

SUMMARY

It would be desirable to provide a combustion staging system which is less likely to suffer from such problems.

Accordingly, in a first aspect, the present invention provides a combustion staging system for fuel injectors of a multi-stage combustor of a gas turbine engine, the system having:
  pilot and mains fuel manifolds respectively distributing fuel to pilot and mains stages of the injectors;
  a splitting unit which controllably splits a metered fuel flow and sends respective portions of the metered flow to the pilot and mains fuel manifolds to perform staging control of the combustor, the splitting unit being able to deselect the mains manifold so that there is no flow into the combustor from the mains manifold;
  a cooling flow recirculation line having a delivery section arranged to provide a cooling flow of fuel to the mains manifold when that manifold is deselected so that the deselected mains manifold remains primed with relatively cool fuel, and a return section arranged to collect the cooling flow from the mains manifold;
  wherein the system further has:
  one or more fuel pressure sensors which detect the pressure of the cooling flow on the recirculation line; and
  a control arrangement which is adapted to close off the recirculation line when the pressure sensor(s) indicates a failure of the cooling flow.

In this way, blockage conditions can be detected before they cause significant damage or failures, and the ability of the system to accommodate damage or failures can be improved, e.g. by taking measures to restrict ingress of combustion gases.

In a second aspect, the present invention provides a gas turbine engine having the combustion staging system according to the first aspect.

Optional features of the invention will now be set out. These are applicable singly or in any combination with any aspect of the invention.

Conveniently, the control arrangement can be an engine electronic controller.

The splitting unit may be a flow splitting valve.

The cooling flow of fuel may enter the delivery section at a fuel recirculating control valve.

The cooling flow of fuel may exit the return section at a recirculating flow return valve.

The combustion staging system may further have a plurality of check valves, such as fuel flow scheduling valves, through which the mains manifold feeds fuel to the respective injectors. The combustion staging system may further have a pressurising arrangement which maintains the pressure of the cooling flow in the recirculation line at a pressure which is lower than a cracking pressure of the check valves.

A connection pipe for carrying the respective portion of metered flow may extend from the splitting unit to the mains manifold, and a branch pipe may branch off the connection pipe. Conveniently, the return section of the cooling flow recirculation line may then include the branch pipe and the portion of the connection pipe from the mains manifold to the branch pipe.

The delivery section may include a delivery pipe into which the cooling flow of fuel is delivered (e.g. from a fuel recirculating control valve), and a recirculation manifold into which the delivery pipe feeds the cooling flow. The recirculation manifold can then distribute the cooling fuel to the mains manifold at the injectors.

The system may have a first fuel pressure sensor which detects the pressure of the cooling flow on the return section. For example, when the cooling flow exits the return section at a recirculating flow return valve, the first fuel pressure sensor may detect the pressure of the cooling flow on the return section adjacent the recirculating flow return valve. Advantageously, the first fuel pressure sensor can be used to detect blockages on the delivery section of the recirculation line.

When the system has the first fuel pressure sensor, at least a portion of the return section of the cooling flow recirculation line may be angled so that the cooling flow of fuel runs downhill in that portion of the return section, the first pressure sensor detecting the pressure of the cooling flow at a location downstream of the downhill angled portion. For example, the above-mentioned connection pipe can be angled downhill. By providing a downhill angled portion, buoyancy forces can discourage any combustion gas which leaks into the mains manifold from entering the downhill angled portion, thus preserving a fuel buffer between the first fuel pressure sensor and the leaked combustion gas. This buffer then gives the first fuel pressure sensor more time to detect characteristic pressure changes indicative of a blockage on the delivery section of the recirculation line. The return section may be angled downhill from a connection of the return section with the mains manifold. In this way, the leaked combustion gas can be discouraged from entering the return section at all. Indeed, the return section may be angled downhill over its entire length. However, another possibility is for the return section to have a U-bend (e.g. formed by the above-mentioned branch pipe). The system may further have a bleeding arrangement for bleeding the return section such that it can be primed with fuel.

When the system has the first fuel pressure sensor, the control arrangement may be adapted to close off the recirculation line when the first pressure sensor detects a changed pressure indicative of a failure of cooling flow.

When the system has the first fuel pressure sensor, the cooling flow of fuel may exit the return section at a recirculating flow return valve which has a shut off position preventing the cooling flow exiting the return section at the recirculating flow return valve, the control arrangement can then be adapted to shut off the recirculating flow return valve when the first pressure sensor indicates a failure of cooling flow. The recirculating flow return valve may have a position sensor which senses the position of the recirculating flow return valve.

The system may have a second fuel pressure sensor which detects the pressure of the cooling flow on the delivery section. For example, when the delivery section has the delivery pipe and the recirculation manifold, the second fuel pressure sensor may detect the pressure at the delivery pipe. Advantageously, the second fuel pressure sensor can be used to detect blockages on the return section of the recirculation line.

When the system has the second fuel pressure sensor, the control arrangement may be adapted to close off the recirculation line when the second pressure sensor detects a raised pressure indicative of a failure of cooling flow.

When the system has the second fuel pressure sensor, the cooling flow of fuel may enter the delivery section at a fuel recirculating control valve which has a shut off position preventing the cooling flow entering the delivery section at the fuel recirculating control valve, the control arrangement can then be adapted to shut off the fuel recirculating control valve when the second pressure sensor indicates a failure of cooling flow. The fuel recirculating control valve may have a position sensor which senses the position of the fuel recirculating control valve.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
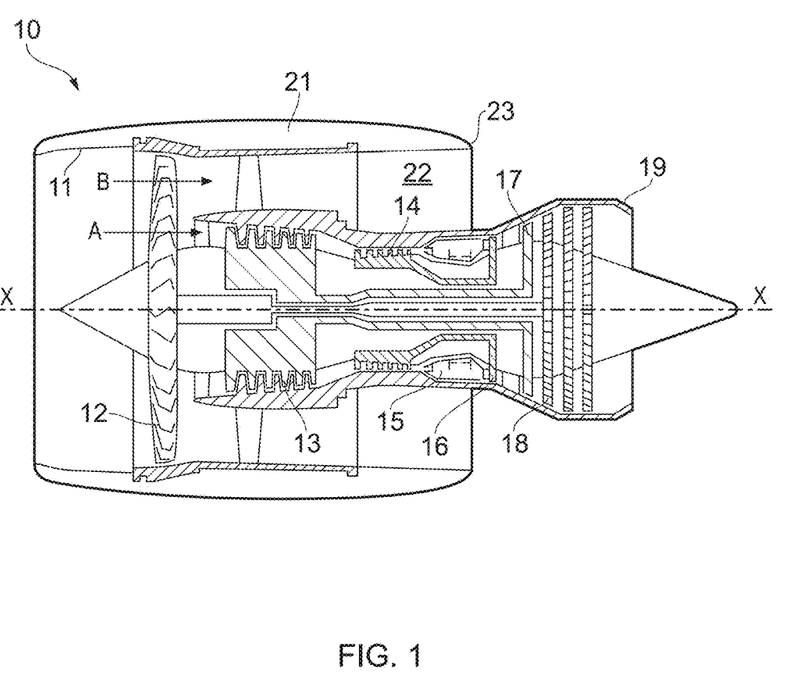
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a pumping unit comprising a low pressure (LP) pumping stage which draws fuel from a fuel tank of the aircraft and and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU further typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such as variable inlet guide vane or variable stator vane actuators) that receive fuel under pressure from the HMU. Further details of such an HMU are described in EP 2339147 A (which is hereby incorporated by reference).

An engine electronic controller (EEC) commands the HMU fuel metering valve to supply fuel to the combustor at a given flow rate. The metered fuel flow leaves the HMU and arrives at a staging system 30, shown schematically in FIG. 2, at a pressure $P_{fmu}$. The staging system splits the fuel under the control of the EEC (not shown) into two flows: one at a pressure $P_p$ for a pilot manifold 31 and the other at a pressure $P_m$ for a mains manifold 32. The pilot manifold feeds pilot nozzles of a number of fuel injectors 33 of the combustor. The mains manifold feeds secondary nozzles of the fuel injectors. Pilot fuel flow scheduling valves (FFSVs) 39 and mains FFSVs 40 at the injectors prevent combustion chamber gases entering the respective manifolds. By varying the fuel split between the manifolds, the EEC can thus perform staging control of the engine.

Figure 2:
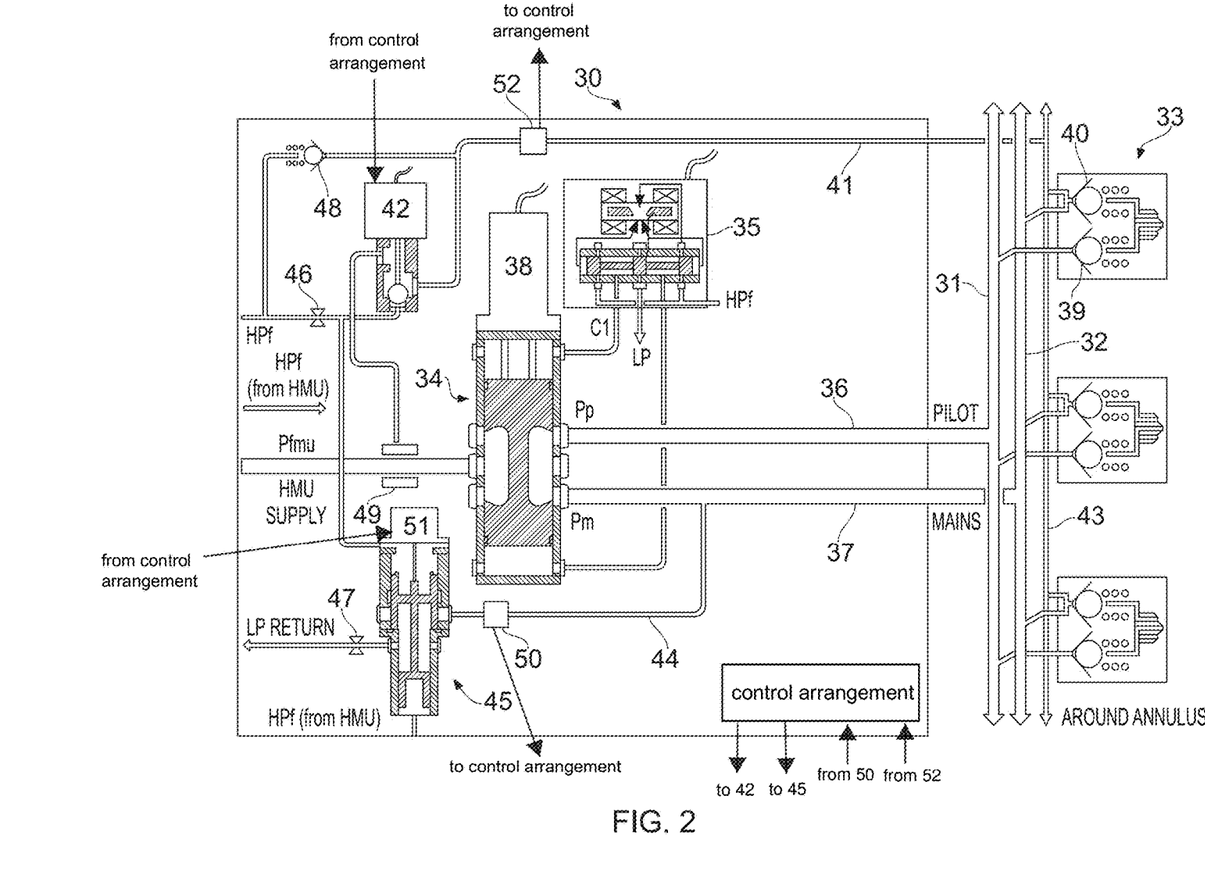
FIG. 2 shows schematically a staging system for fuel injectors of the combustor of the engine of FIG. 1.

In more detail, the staging system 30 has a fuel flow splitting valve (FSV) 34, which receives the metered fuel flow from the HMU at pressure $P_{fmu}$. A spool is slidable within the FSV under the control of a servo valve 35, the position of the spool determining the outgoing flow split between a pilot connection pipe 36 which delivers fuel to the pilot manifold 31 and a mains connection pipe 37 which delivers fuel to the mains manifold 32. The spool can be positioned so that the mains stage is deselected, with the entire metered flow going to the pilot stage. An LVDT 38 provides feedback on the position of the spool to the EEC, which in turn controls staging by control of the servo valve.

The staging system 30 also has a recirculation line to provide the mains manifold 32 with a cooling flow of fuel when mains manifold is deselected. The recirculation line has a delivery section including a delivery pipe 41 which receives the cooling flow from a fuel recirculating control valve (FRCV) 42, and a recirculation manifold 43 into which the delivery pipe feeds the cooling flow. The recirculation manifold has feeds which introduce the cooling flow from the recirculation manifold to the mains manifold via connections to the feeds from the mains manifold to the mains FFSVs 40.

The recirculation line also has a return section which collects the returning cooling flow from the mains manifold 32. The return section is formed by a portion of the mains connection pipe 37 and a branch pipe 44 from the mains connection pipe, the branch pipe extending to a recirculating flow return valve (RFRV) 45 from whence the cooling flow exits the recirculation line.

The cooling flow for the recirculation line is obtained from the HMU at a pressure $HP_f$ via a cooling flow orifice 46. On leaving the RFRV 45 via a pressure raising orifice 47, the cooling flow is returned at a pressure $P_{lp}$ to the pumping unit for re-pressurisation by the HP pumping stage. A check valve 48 limits the maximum pressure in the recirculation line. The HMU also supplies fuel at pressure $HP_f$ for operation of the servo valve 35 and the RFRV 45. The FRCV 42 and the RFRV 45 are operated under the control of the EEC.

When the mains is staged in, a cooling flow is also directed through the recirculation manifold 43 to avoid coking therein. More particularly a small bypass flow is extracted from the HMU's metered fuel flow at pressure $P_{fmu}$. The bypass flow is sent via a flow washed filter 49 to a separate inlet of the FRCV 42, and thence through the delivery pipe 41 to the recirculation manifold 43. The bypass flow exits the recirculation manifold to rejoin the mains fuel flow at the injectors 33.

A blockage on the delivery section of the recirculation line can cause a loss of cooling flow and/or pressure in the recirculation line at the injectors 33. This potentially allows combustion gases to enter the system at the injectors and reach the RFRV 45 via the return section of the recirculation line.

As a safeguard against this, the staging system 30 has a first pressure sensor 50 on the branch pipe 44. The first pressure sensor is preferably located adjacent the RFRV 45 so that any combustion gas entering the system has to displace more fuel before reaching the sensor. This can give the sensor more time to react to the blockage conditions and alert the EEC before exposing the sensor to combustion gases. The RFRV has an additional position that can block flow through the RFRV to the fuel supply system pumping unit (via the LP return at the pressure raising orifice 47). If the first pressure sensor indicates a blockage, the EEC can thus close the RFRV. A proximity sensor 51 on the RFRV can provide feedback to the EEC to confirm closure of the RFRV and also to alert the EEC to failure of the RFRV.

Figure 3:
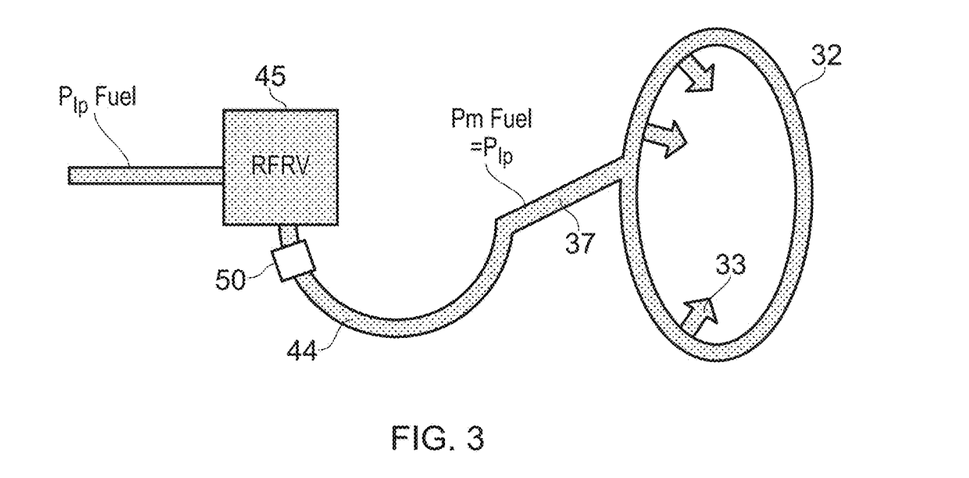
FIG. 3 shows schematically a part of the staging system of FIG. 2, including a return section of a recirculation line, during normal operation with the mains deselected.

FIG. 3 shows schematically a part of the staging system 30, including the return section of the recirculation line, during normal operation with the mains deselected. More particularly, FIG. 3 shows the mains manifold 32, the injectors 33, the branch pipe 44, the portion of the mains connection pipe 37 from the mains manifold to branch pipe, the RFRV 45, and the LP return from the RFRV. The cooling flow of fuel passes in flow series through the mains manifold, the portion of the mains connection pipe, the branch pipe and the RFRV. The injectors are primed with fuel but there is no flow from them into the combustor as the pressure in the mains manifold $P_m$ is greater than the combustion chamber pressure $P_{cc}$ but produces a pressure difference across the mains FFSVs 40 which is less than the pressure difference that would cause the mains FFSVs 40 to open. Thus the mains FFSVs 40 stay closed.

Figure 8:
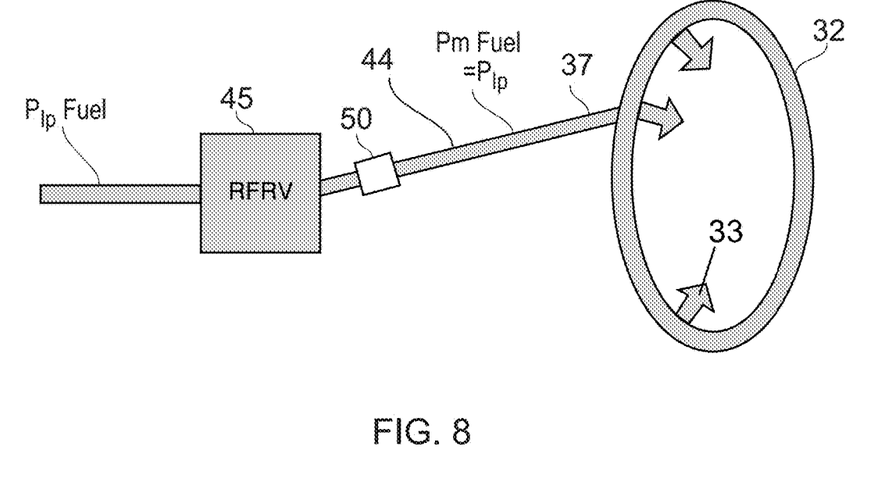
FIG. 8 shows schematically the same part of the staging system of FIG. 2, but having a variant return section of the recirculation line.

At least a portion of the return section of the cooling flow recirculation line is angled so that the cooling flow of fuel runs downhill in that portion of the return section, the first pressure sensor 50 being located after the downhill portion. In particular, the portion of the mains connection pipe 37 can be angled downhill and/or the branch pipe 44 can have a U-bend, both possibilities being shown in FIG. 3. Indeed, if the RFRV 45 can be located lower than the connection of the mains connection pipe with the mains manifold 32, the return section can be angled downhill over its entire length, as shown in FIG. 8. The U-bend can be formed in the branch pipe as it extends along a side of the engine. Another option, however, is to form the U-bend by routing the pipe from one side of the engine to the other via the underside of the engine. The return section may have a self-bleeding arrangement to support initial priming.

Figure 4:
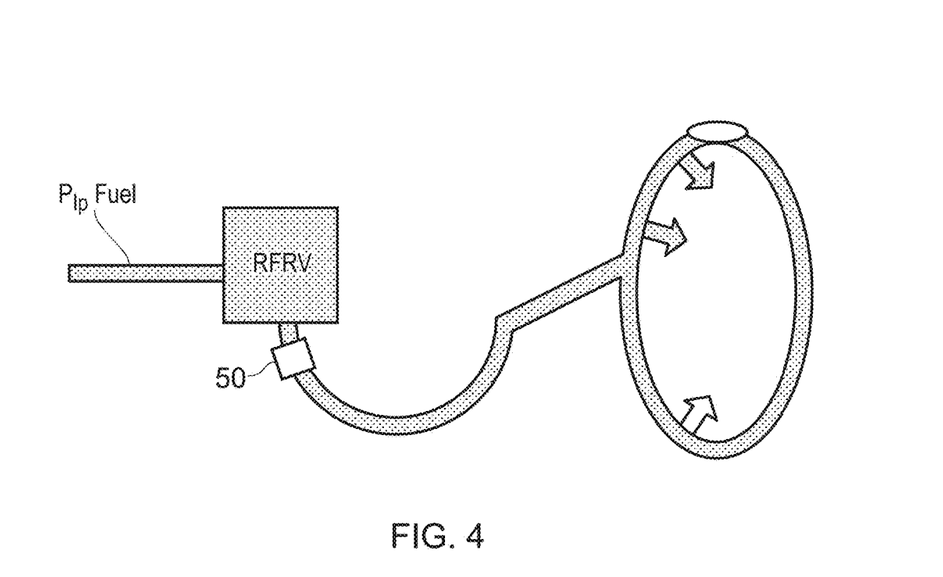
FIG. 4 shows schematically the same part of the staging system as FIG. 3, but with a blockage on a delivery section of the recirculation line and leaked gas in the system.

FIG. 4 shows schematically the same part of the staging system 30, but now with a blockage on the delivery section of the recirculation line. The pressure in the mains manifold 32 reduces so that it is now much less than combustion chamber pressure $P_{cc}$. More particularly, under such blockage conditions the mains manifold pressure tends towards $P_{lp}$, the pressure on LP return from the RFRV 45, rather than staying at its normal operation pressure which is between $P_{cc}$ and $P_{cc}$ plus the cracking pressure of the mains FFSVs 40.

Under these conditions, the mains FFSVs can leak combustion chamber gas into the recirculation line. For example, FIG. 4 illustrates such leakage at the lowest injector 33, although more than one injector may contribute a leakage flow of combustion gas under the blockage conditions. Combustion gas at higher pressure than the reduced mains manifold pressure passes into the mains manifold, and rises due to buoyancy forces, displacing fuel in the mains manifold out through the RFRV. The gas is contained in the mains manifold as there is no differential pressure to open any of the other mains FFSVs. However, the buoyancy of the gas prevents it from passing through the downhill portion of the return section.

Figure 5:
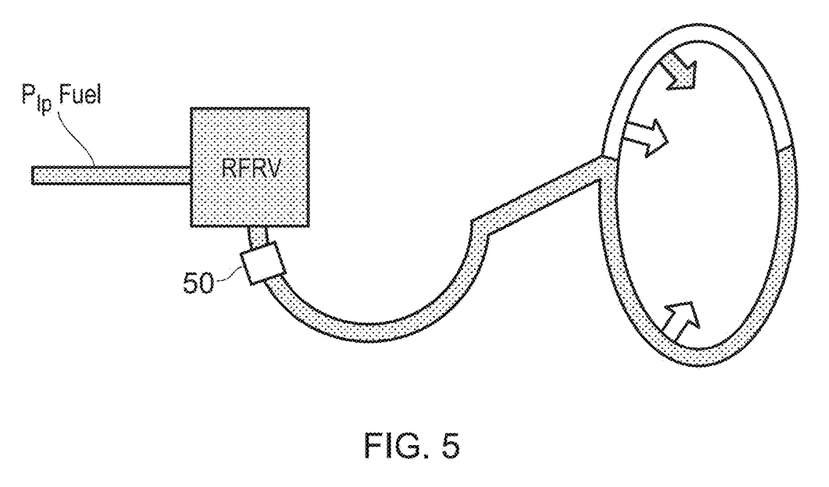
FIG. 5 shows schematically the same part of the staging system FIG. 3, but with more leaked gas in the system.
Figure 6:
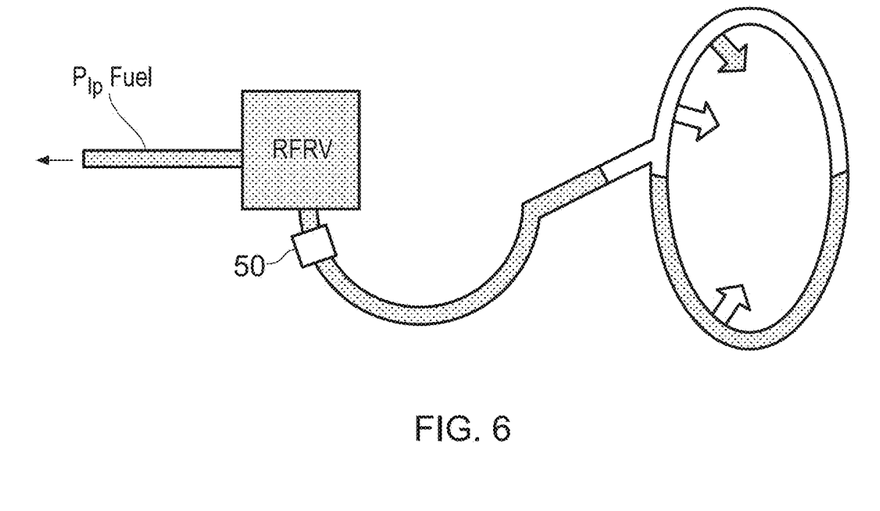
FIG. 6 shows schematically the same part of the staging system FIG. 3, but with yet more leaked gas in the system.

FIGS. 5 and 6 show schematically the same part of the staging system 30, but with progressively more leaked gas in the system. More particularly, FIG. 5 shows the mains manifold 32 now filled with gas to the level of the entrance to the return section, the volume of fuel in the mains manifold below the entrance to the return section remaining undrained (this fuel only drains if a mains FFSV has failed, leaking fuel into the combustion chamber). Some of the injectors 33 are also filled with gas, although others may contain undrained fuel. The gas is prevented from passing through the downhill portion of the return section of the recirculation line until the mains manifold is emptied to the level of the entrance to the return section. The gas pressure in the manifold then rises until (taking into account any head effects due to geometry) it exceeds $P_{lp}$, the pressure on the LP return from the RFRV, at which point, as shown in FIG. 6, the gas pushes into the downhill portion of the return section. As a result of these processes, the blockage in the recirculation line produces a characteristic change in the pressure detected by the first pressure sensor 50. The length of the downhill portion gives the EEC time to react to this pressure change by closing the RFRV 45, thereby preventing the leaked gas from passing through the RFRV to the pumping unit. Closure of the RFRV to block the cooling flow return is acceptable as the cooling flow is used to maintain mains manifold temperature in normal operation, and when a blockage has occurred on the delivery section of the recirculation line this management of manifold temperature is redundant.

It is preferable to detect the characteristic pressure change at the first pressure sensor 50, rather than, for example, at a pressure sensor which senses the pressure directly in the mains manifold 32 because, in general, a sensor on mains manifold can only give the EEC warning of a blockage in sufficient time to take suitable counter action (closure of the RFRV 45 plus confirmation of operation of the RFRV by the proximity sensor 51) if the rate of leakage around the FFSVs 40 is low. That is, the downhill portion of the return section extends the time period for detection of changed pressure before the leaked gases reach the bottom of the downhill portion. This period of changed pressure can be extended further by increasing the volume of the return section before the bottom of the downhill portion (e.g. by increasing pipe diameters) such that more fuel in the manifold has to be displaced. The downhill portion may be routed vertically or at an angle. It may include a tapered shoulder to avoid air bubbles at initial priming and/or subsequent staging selection.

The above analysis considers the leakage of combustion gas as a hydrostatic problem rather than a dynamic flow problem, as a leaking mains FFSV 40 is unlikely to cause an unrestrained combustion gas jet into the manifold. Moreover, there is a limit to $P_{cc}$ above which the mains manifold 32 is staged in, such that a high $P_{cc}$ scenario does not need to be accommodated.

Figure 7:
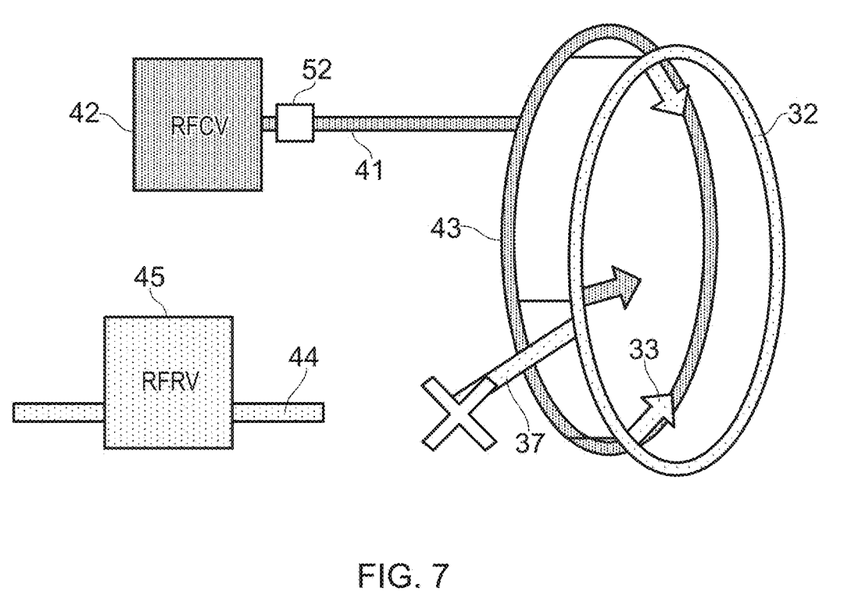
FIG. 7 shows schematically the staging system of FIG. 2 with a blockage on the return section of the recirculation line.

FIG. 7 shows schematically the staging system 30, but now with a blockage on the return section of the recirculation line. Such a blockage can lead to an increased pressure in the recirculation line producing unscheduled opening of the mains FFSVs 40. As a safeguard against this, the system has a second pressure sensor 52 located on the delivery pipe 41 between the FRCV 42 and the recirculation manifold 43. In particular, if the second pressure sensor detects a pressure increasing to above $P_{cc}$ plus the cracking pressure of the mains FFSVs 40, the EEC can command closure of the FRCV. The blockage may also be detected by a drop in pressure sensed at the first pressure sensor 50 from $P_m$ to $P_{lp}$. However, this detection is only possible if the blockage occurs upstream of the first pressure sensor.

A leak test of the mains FFSVs 40 can be performed by closing the FRCV 42 and the RFRV 45 and monitoring for an increase in $P_m$, either relative to $P_{cc}$ or independently due to isolation of the mains manifold 32 from HP fuel pressure. Thermal expansion effects on the fuel in the manifold may have to be considered, as $P_m$ may increase to the mains FFSV crack pressure under normal operating conditions.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A combustion staging system for fuel injectors of a multi-stage combustor of a gas turbine engine, the combustion staging system comprising:
    a pilot fuel manifold and a mains fuel manifold respectively distributing fuel to pilot stages and mains stages of the fuel injectors;
    a splitting unit that controllably splits a metered fuel flow and sends respective portions of the metered fuel flow to the pilot fuel manifold and the mains fuel manifold to perform staging control of the multi-stage combustor, the splitting unit being able to deselect the mains manifold so that there is no flow into the multi-stage combustor from the mains manifold;
    a cooling flow recirculation line having a delivery section arranged to provide a cooling flow of fuel to the mains manifold when the mains manifold is deselected so that the deselected mains manifold remains primed with relatively cool fuel, and a return section arranged to collect the cooling flow from the mains manifold, at least a portion of the return section of the cooling flow recirculation line is angled so that the cooling flow of fuel runs downhill in that portion of the return section, wherein the combustion staging system further has:

a first fuel pressure sensor that detects the pressure of the cooling flow on the return section, the first fuel pressure sensor detecting the pressure of the cooling flow at a location downstream of the downhill angled portion such that the downhill angled portion preserves a fuel buffer between the first fuel pressure sensor and the mains manifold; and a control arrangement that is adapted to close off the cooling flow recirculation line when the first fuel pressure sensor indicates a failure of the cooling flow.

2. The combustion staging system according to claim 1, wherein the return section is angled downhill from a connection of the return section with the mains manifold.

3. The combustion staging system according to claim 1, wherein the return section has a U-bend.

4. The combustion staging system according to claim 1, wherein the return section is angled downhill over an entire length of the return section.

5. The combustion staging system according to claim 1, wherein the control arrangement is adapted to close off the cooling flow recirculation line when the first pressure sensor detects a changed pressure indicative of a failure of the cooling flow.

6. The combustion staging system according to claim 1, wherein the cooling flow of fuel exits the return section at a recirculating flow return valve that has a shut off position preventing the cooling flow exiting the return section at the recirculating flow return valve, the control arrangement being adapted to shut off the recirculating flow return valve when the first pressure sensor indicates a failure of the cooling flow.

7. The combustion staging system according to claim 1, wherein the combustion staging system has a second fuel pressure sensor that detects the pressure of the cooling flow on the delivery section.

8. The combustion staging system according to claim 7, wherein the control arrangement is adapted to close off the cooling flow recirculation line when the second fuel pressure sensor detects a raised pressure indicative of a failure of the cooling flow.

9. The combustion staging system according to claim 7, wherein the cooling flow of fuel enters the delivery section at a fuel recirculating control valve that has a shut off position preventing the cooling flow entering the delivery section at the fuel recirculating control valve, the control arrangement being adapted to shut off the fuel recirculating control valve when the second fuel pressure sensor indicates a failure of the cooling flow.

10. A gas turbine engine having the combustion staging system according to claim 1.

* * * * *